Figure 8:
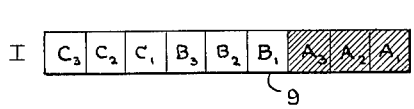

Nov. 16, 1965  A. SIMMON  3,217,594
PHOTOGRAPHIC PRINTER AND ENLARGER AND
LIGHT MIXING DEVICE THEREFOR
Filed Feb. 27, 1963   2 Sheets-Sheet 1
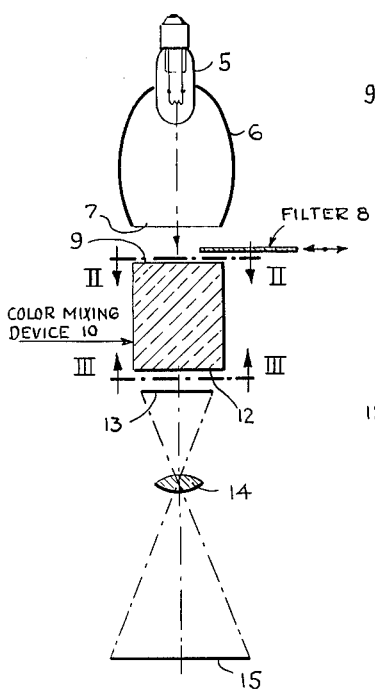
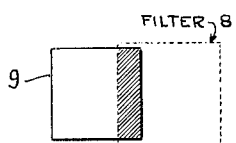
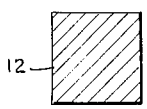
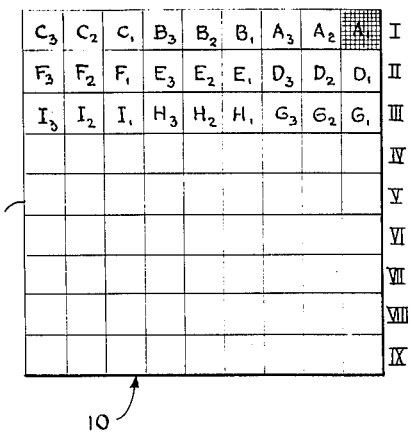
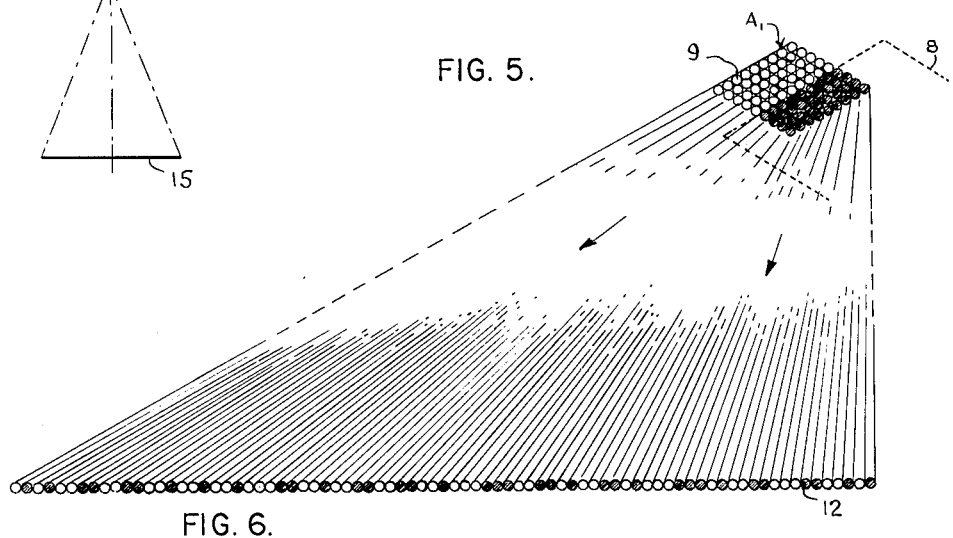
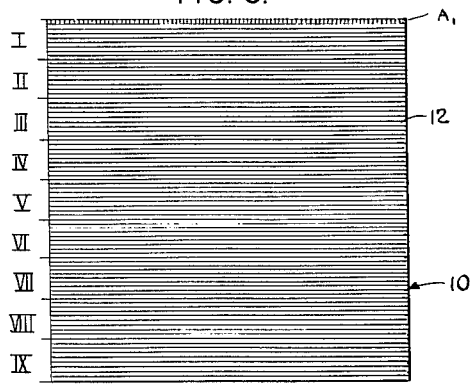
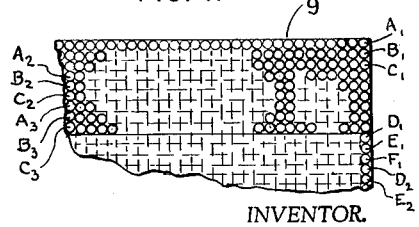
INVENTOR.
ALFRED SIMMON.
ATTORNEY.

Nov. 16, 1965 A. SIMMON 3,217,594
PHOTOGRAPHIC PRINTER AND ENLARGER AND
LIGHT MIXING DEVICE THEREFOR
Filed Feb. 27, 1963 2 Sheets-Sheet 2

INVENTOR.
ALFRED SIMMON.
BY
ATTORNEY

United States Patent Office

3,217,594
Patented Nov. 16, 1965

1

3,217,594
PHOTOGRAPHIC PRINTER AND ENLARGER AND LIGHT MIXING DEVICE THEREFOR
Alfred Simmon, Garden City, N.Y., assignor to Simmon Brothers, Inc., Long Island City, N.Y., a corporation of New York
Filed Feb. 27, 1963, Ser. No. 261,451
4 Claims. (Cl. 88—24)

The present invention relates to apparatus especially for the making of color prints and enlargements from a film transparency and it pertains more particularly to a light mixing device which forms a part of such photographic printers and enlargers.

Devices of this general type are now well known to the art with one such device being shown in my prior U.S. Patent No. 3,028,483, issued April 3, 1962. One of the most difficult problems existing with apparatus of this type is that of properly mixing the color of the light beam in order to produce a print or enlargement having true uniform color fidelity. In the apparatus shown and claimed in my above-noted prior patent, the color of the light beam is mixed by diffuse reflection produced by a so-called integrated sphere and while this constituted a considerable advance in the art it nevertheless is not a complete answer to the problem. In such a device the loss of light intensity due to multiple reflections is considerable and the intensity of the light beam and color distribution emanating from the exit aperture of the integrating sphere leaves much to be desired, unless the size of the aperture is made small compared with the diameter of the sphere which is highly undesirable for practical reasons.

The foregoing shortcomings of an integrating sphere can be minimized to a great extent by the use of more than one light source as disclosed in my aforementioned patent No. 3,028,483 and by utilizing a step-filter, such as disclosed and claimed in U.S. Patent No. 3,077,140 granted February 12, 1963 and assigned to the same assignee as the present invention, and of which I am a coinventor. However, these expedients are somewhat complicated and expensive and at the same time do not represent a complete solution to all the ramifications of the problem.

It is accordingly the primary object of the present invention to provide a photographic printer and enlarger particularly suitable for the making of color prints employing a mixing device wherein the color and intensity of the light entering the mixing device is thoroughly scrambled so that no trace of the entrance light pattern is discernable in the exit light beam from such mixing device.

Another object of the present invention is the provision of a photographic printer and enlarger for the making of color prints wherein the mixing chamber forming a part thereof comprises a plurality of light-transmitting fibers so arranged and orientated that the entrance light beam is thereby thoroughly scrambled to produce an exit beam of uniformly distributed color and intensity and differing entirely from the pattern of the entrance light beam.

A further object of the present invention is the provision of a mixing device for a photographic printer and enlarger wherein such device is formed of elongated light transmitting fibers having a predetermined grouped arrangement at its entrance end as well as an entirely different but predetermined grouped arrangement at its exit end which thereby operates to mix the light of a colored and uncolored light beam entering such device so that the light beam emerging from its exit end is uniformly colored regardless of the intensity of such light beam.

2

Still further objects of the present invention will become obvious to those skilled in the art by reference to the accompanying drawings wherein:

FIGURE 1 is a schematic diagram of a photographic printer and enlarger employing my novel mixing device and constructed in accordance with the present invention.

Figure 9:
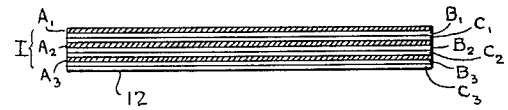
Figure 10:
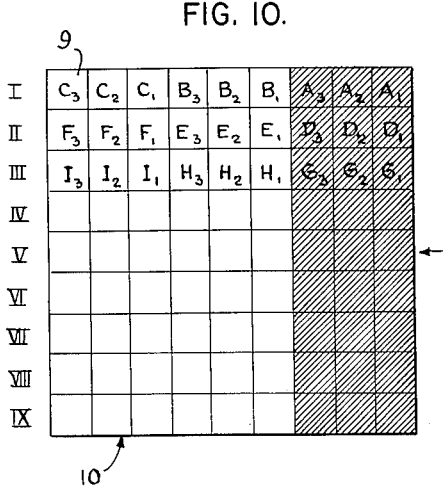
Figure 11:
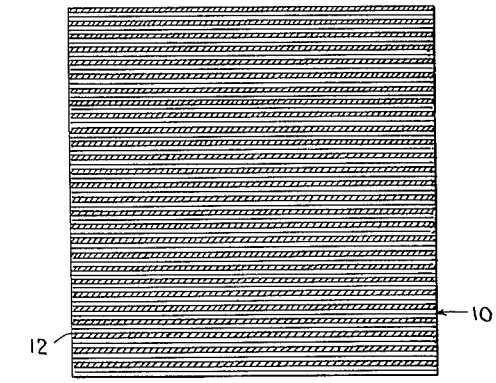

FIG. 2 is a sectional view taken on the line II—II of FIG. 1 and representing a cross-section of the partially colored light beam passing into the entrance end of the mixing device of FIG. 1, FIG. 3 is a sectional view taken on the line III—III of FIG. 1 and representing a cross-section of the uniformly colored light beam emanating from the exit end of the mixing device of FIG. 1, FIG. 4 is a top enlarged view of the mixing device of FIG. 1 thus constituting also a plan view of the entrance end thereof which has been depicted as composed of eighty-one rectangular sections or "groups" for the purpose of better explanation thereof, FIG. 5 is a schematic illustration which for purposes of explanation may be considered as a vertical view of one of the rectangular "groups" of FIG. 4 partially covered by a color filter, FIG. 6 is a schematic illustration which for purposes of explanation may be considered a plan view of the exit end of the mixing chamber of FIG. 1 and depicting the thin lines of the colored light beam emanating from the exit end of the mixing chamber which correspond to the eighty-one rectangular sections or elements shown in FIG. 4, FIG. 7 is a fragmentary plan view similar to FIG. 6 but showing the predetermined arrangement of the ends of the light-transmitting fibers to produce the desired mixing or scrambling resulting in the emerging light beam having uniform distribution of color and intensity, FIG. 8 is a fragmentary plan view of a portion of the entrance end of the mixing device as shown in FIG. 4 when a colored filter is moved further into the area of the entrance light beam and is thus superimposed over three "groups" of a single row of light-transmitting fibers, FIG. 9 depicts the resulting increase in effect of the mixed color emanating from the exit end of the mixing device as a result of covering the three "groups" with a color filter as shown in FIG. 8, FIG. 10 is a view similar to that of FIG. 4 but showing the light beam at the entrance end of the mixing device when the entire width thereof and hence a greater number of "groups" is covered by a color filter, FIG. 11 is a view similar to FIG. 9 but now illustrating the scrambled color which produces a light beam having uniform color and intensity distribution over the entire exit window area of the mixing device when the entrance end thereof is partially covered by a color filter for its entire width as shown in FIG. 10, and the exit end of such "groups" are systematically intermingled with others of a different "group."

Figure 12:
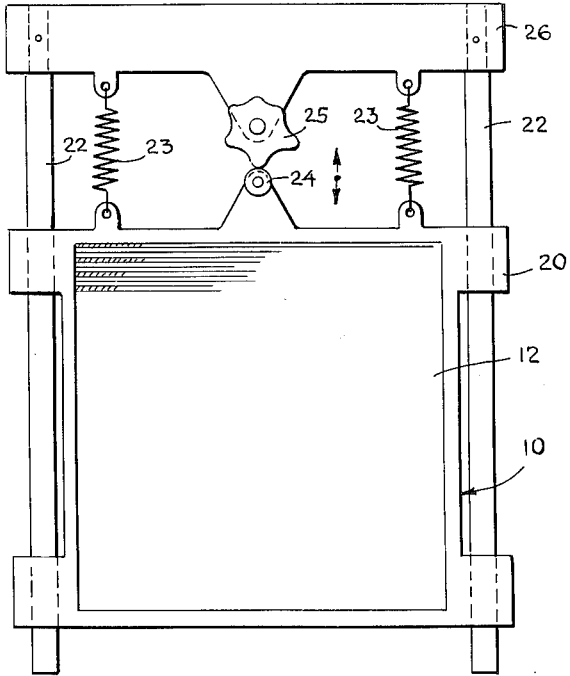
Figure 13:
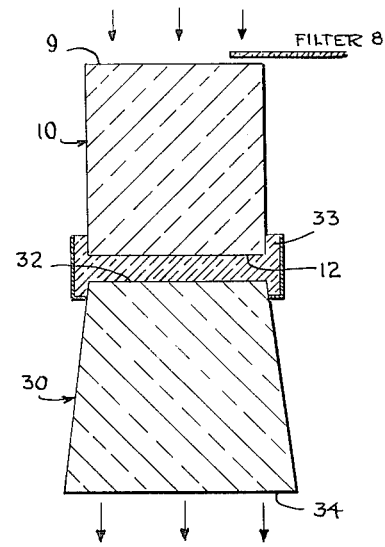

FIG. 12 shows an apparatus for imparting oscillatory movement to the exit end of the mixing device if and when desired, and FIG. 13 is a vertical section view of a slight modification which the mixing device of the present invention may take.

The desideratum of the present invention is accomplished by the provision of a photographic printer and enlarger wherein a light mixing device utilizing a variation of what is now well known as fiber optics is employed to scramble a colorless and a colored light beam entering such mixing device so that a light beam of uniform color and intensity distribution emerges from the exit window thereof. Heretofore fiber optics have been employed for the specific purpose of transmitting images and hence the individual fibers are so orientated that the pattern of the light beam emerging from a bundle of fibers is as near as possible to the pattern of the light entering the fiber bundle. In the present instance, however, the direct antithesis is employed by so systematically intermingling the fibers at the exit end of the bundle in a different arrangement to their entrance end that the emerging light beam is completely dissimilar to that entering the mixing device made up of a plurality of such bundles.

Referring now to the accompanying drawings showing one form which the present invention may take, a photographic printer and enlarger is schematically shown in FIG. 1 comprising a light source 5 disposed at the upper end of a surrounding light collecting reflector or housing 6 having an exit aperture 7. The light beam emerging from this aperture 7 is intercepted either partially or entirely by the adjustment of one or more color filters 8, usually formed of the three "minus" colors, cyan, magenta and yellow which are movable by an operator in either direction as indicated by the arrow in FIG. 1. The light resulting from the interception by the filter 8 is thus formed into two adjacent beams, one unfiltered, and therefore white, and the other filtered, and therefore colored, with these two beams passing into the upper end or entrance window 9 of a mixing device 10, where the two beams are mixed so that the light emerging from the lower end or exit window 12 of the mixing device 10 is uniform in color and intensity, with the degree of coloring depending upon the position of the filter 8 relative to the area of the reflector exit aperture 7 and the density of the filter or filters 8. This light beam of uniform color and intensity then passes through a film transparency 13 and is focused by means of a lens 14 on to a sheet or strip of sensitized paper 15, for the making of a print or enlargement of the image appearing on the film transparency 13 in the customary manner.

The mixing device 10, as hereinabove mentioned, is formed of a plurality of light-transmitting fibers of glass or plastic, so assembled as to form what I shall hereinafter refer to as an "element," with each such element, as shown more particularly in FIG. 5, being formed, for example, of eighty-one short fiber strands having a square configuration at the entrance window 9. Although such element at its upper end has been illustrated as forming a square it may assume a different configuration such as a hexagon, a circle, or any general compact design, with an area that preferably is at least half as large as the area of a circumscribed circle. In order to mix the color of light entering the upper end of such an element it might at first be assumed that desired mixing could be accomplished by simply clamping all strands together at the upper end and mixing the other lower ends thoroughly in some manner and finally clamping these randomly disposed ends together. However, such an arrangement will work even moderately well only for very long strands (long in relation to cross-section of a bundle) because all strands have a natural tendency to arrange themselves along substantially parallel lines, and even if the precise pattern of the incoming beam is no longer sharply defined in the outgoing beam, it is virtually impossible to achieve satisfactory uniformity of light and color over the entire area of the exit window of the mixing device in such manner. Also, for practical reasons very long bundles cannot be used in any event since they cause a high loss of light and are large, heavy and expensive.

Accordingly, it has been found desirable to arrange the lower or exit end of the light-transmitting fibers in a predetermined manner which will thus accomplish the light mixing in a systematic and predictable manner thus completely obviating the above mentioned disadvantages. By reference again to FIG. 5 it will be noted that the strands which form the square entrance window of the element are formed into a narrow rectangular area which in the extreme case is a row of strand ends at its exit end. Such an element can be readily formed by first clamping the fiber strands together in the form of a square or the like at one end and arranging the other loose ends at random in a single row upon a suitable plane and horizontal surface and then pressing a length of narrow adhesive tape upon the fibers after which the element may be lifted from the surface and the fibers thereafter cemented together. If now the entrance end or window 9 of such an element is partially covered by a colored filter 8, as shown by the dotted line in FIG. 5, the entering light will be uncolored over the unshaded ends of the element strands and colored over the darkly shaded strand ends thereof as shown in FIG. 5. The light thus emerging from the exit end 12 of the element is made up of a row of small illuminated circles forming a thin line consisting of colored and white portions randomly disposed, with the color portion thereof shown by the small black circles and the white light portions by the white circles at the exit end 12, as seen in FIG. 5.

By reference now to FIGS. 4 and 6 it will be noted that the mixing device 10 is actually formed of a group of these elements with the square entrance windows of all elements making up a group placed side by side in a straight line with nine (IX) such groups making the entire mixing device 10. It is to be understood, however, that a group may be formed in a curved line if, for example, the reflector aperture 33 is round instead of rectangular. Assuming, however, the elements are arranged in a straight line, as shown in FIG. 4, the entrance window of a group is a rectangle having a length corresponding to the width of the entrance aperture 9 of the mixing device 10 and with such group having a width equal to that of the entrance window of an element. Each row of individual elements, as shown in FIG. 5, may be arranged along adjacent and parallel lines with the result that, as a filter 8 is moved progressively across the entrance window of a group, a thin colored line appears at the exit window 12 of the mixing device 10, as seen in FIG. 6, as soon as the square entrance window of element $A_1$ is covered by the filter. The apparent thickness of this colored line doubles as soon as the filter 8 covers the entrance window of element $A_2$ because exit window $A_2$ constitutes a row immediately adjacent to that of element $A_1$ so generally speaking the thickness of the colored line in FIG. 6 increases in proportion to the number of elements whose entrance windows are covered by the filter 8 and when all the entrance windows of each individual element of a group are covered by the filter then that entire group will of course emit colored light.

Although the above described arrangement, in which the elongated exit window of the elements of a group are arranged in the same sequence in one direction as the respective square entrance windows of the same elements in another or perpendicular direction, is the simplest arrangement it is not necessarily the best in order to achieve the most nearly uniform color distribution. To improve the latter still further reference may be had to FIG. 8 wherein it will be noted that a group of nine elements have been divided into sub-groups A, B and C, each sub-group comprising the elements $A_1$, $A_2$, $A_3$–$B_1$, $B_2$, $B_3$ and $C_1$, $C_2$, $C_3$ with the square entrance windows of these elements arranged in this progressive sequence in the direction of covering movement of filter 8. However, the sequence of the corresponding elongated exit windows of each element is systematically rearranged and intermingled at the exit end 12 of the mixing device 10, so that the rows of individual elements no longer correspond to the alignment of their entrance windows but on the contrary comprise adjacent parallel rows from each sub-group, namely, $A_1$, $B_1$, $C_1$–$A_2$, $B_2$, $C_2$ and $A_3$, $B_3$, $C_3$ as can be seen in FIG. 7.

The advantages of this particular modification of the present invention can be better appreciated by reference to FIG. 9 which depicts the colored light pattern emanating from exit window 12 of the mixing device 10 as the filter is moved across the elements of sub-group A of FIG. 8. At first, when only the entrance window of element $A_1$ is covered by the filter 8, a thin colored line appears at the exit window of the group (as previously described relative to FIG. 6) and as shown by the shaded (for color depiction) line $A_1$ in FIG. 9. Then as element $A_2$ is covered by the filter 8 a second thin line of colored light appears at the exit window 12, as shown by the shaded line $A_2$ in FIG. 9. However, also as shown in this latter figure in this instance the shaded line $A_2$ is not immediately adjacent to shaded line $A_1$ but instead is spaced two unfiltered light lines away provided by the exit windows of elements $B_1$ and $C_1$, whose entrance windows have not yet been reached by the filter 8. The same result ensues when the entrance window of element $A_3$ is covered by the filter 8 resulting in three thin colored lines appearing with two unfiltered light lines spaced therebetween.

From this point on as the filter 8 progressively covers the elements of sub-groups B and C (FIG. 8) no more colored lines effectively appear at the exit window 12 of the mixing device 10. On the contrary the apparent thickness of existing colored lines $A_1$, $A_2$ and $A_3$ increases because the color produced at the exit window of element $B_1$ will appear to increase the thickness of adjacent colored line $A_1$, line $B_2$ will appear to broaden colored line $A_2$, and similarly $B_3$ will produce the illusion of increasing the thickness of colored line $A_3$. It should also be apparent that although the foregoing description has been confined to the elements of only group I, as shown in FIGS. 4, 8 and 10, the same identical results follow with respect to remaining groups II to IX shown in FIG. 10, and when the first three elements of each group are covered by the filter 8, as illustrated by the shading of the first three elements of each group in FIG. 10 and as shown by the position of such filter over the entrance window 9 in FIG. 2, the color distribution emerging throughout the entire area of exit window 12 of the mixing device 10 will approximate that shown in FIGS. 3 and 11, wherein the concentrated color over the limited area at the entrance window 9 of the mixing device 10 as seen in FIG. 2 is now distributed over the complete exit area 12 thereof as shown in FIG. 3.

The mixing device 10 itself may be formed in a somewhat similar manner to that previously described relative to the fabrication of the single element of FIG. 5, by merely superimposing one such element upon another and selecting the appropriate exit end of each element and intermingling them with others of a different sub-group to thereby produce the desired results referred to relative to FIGS. 10 and 11. Thus the entrance window 9 of the complete mixing device 10 will then have the appearance of a mosaic made up of many square entrance windows of individual elements while the exit window 12 will consist of equally as many parallel rows of fiber ends (or narrow rectangles), each row representing the exit window of an individual element. Accordingly as the colored filter 8 moves across the entrance window 9 of the mixing device 10, which is in the same direction as that of the elongated exit windows of the various groups of elements, numerous evenly spaced and parallel colored lines will appear in the exit window 12 of the complete mixing device 10, as shown particularly in FIG. 11, with such lines increasing in apparent thickness as the filter advances, resulting in the entire exit window 12 emitting colored light of greatest intensity when the complete entrance window 9 is covered by the filter. Also, in one modification only one colored line of varying thickness is produced for each group of elements, whereas in the second preferred modification above described as many evenly spaced colored lines are caused to appear as there are sub-groups in a complete group which thus produces a more nearly perfect color mixture.

It should also be apparent from the foregoing that if the diameter of the individual light-transmitting fibers is sufficiently small, and the number of elements, groups and sub-groups, are relatively large, then the lines that appear in the exit window 12 of the mixing device 10 become so numerous and so closely spaced, that the exit window assumes an apparently uniform and homogeneous appearance. In other words, the pattern of colored and white lines will not be discernible in the image of the transparency 13 that is projected by the lens 14 upon the sheet of sensitized material 15. However, in those instances where economy is of primary interest it may be desirable to utilize light-transmitting fibers of somewhat larger diameter in which event traces of a line pattern may become visible on the projected image and hence it is desirable that they be obliterated in a suitable manner.

One of the simplest methods of obliterating such lines is to interpose a sheet of light diffusing material, such as ground glass or opal plastic, in the light beam prior to its impingement upon the sensitized printing paper 15 and preferably between the exit window 12 and the transparency 13. The disadvantage of this solution, however, resides in the fact that a relatively high loss of light of the order of fifty percent (50%) occurs. To eliminate such loss and at the same time obliterate these aforesaid lines without loss of light intensity, a reciprocating or oscillatory motion may be imparted to the exit end of the fiber bundle or "element" in a direction at right angles to the colored lines that appear in the exit window 12. A device for such purpose is accordingly shown in the modification of FIG. 12 wherein only the exit window 12 of the mixing device 10 is affixed to a frame 20 slidably supported by two guide rods 22 and biased by a pair of springs 23, which press a cam roller 24 secured to the frame 20 against a cam 25.

This cam 25 is shown secured to a stationary bar 26 supported by the guide rods 22 with such cam being rotated by an electric motor or the like (not shown) at a suitably preselected speed and, as will be noted from FIG. 12, the lobes of such cam 25 are of different heighths. Such difference in the heighth of these lobes thus assures that reversal of the oscillatory movement of the frame 20, and hence the exit ends of the fibers making up the elements of the exit window 12 of the mixing device 10, does not always occur at the same place which thus minimizes the danger of lines being formed on the sensitized sheet 15 during the enlarging or printing process at the points of reversal, where the end 12 of the mixing device invariably comes to a momentary standstill. Moreover, the speed of the motor and hence the rotation of cam 25 is such that the amplitude of the oscillatory movement of the frame 20 and of course the exit window 12 is quite small because in theory it need only be slightly larger than the distance between lines of two adacent sub-groups of elements. Also the frequency of these oscillations likewise are relatively low since only a few need be performed during an exposure, with this combination of small amplitude and low frequency producing the practical advantage that it thus becomes a simple matter to prevent obectionable vibrations of the enlarger itself during an exposure.

A still further modification of the present invention, wherein any line pattern that might otherwise become visible in the exit window of the mixing device is eliminated, has been shown in FIG. 13. Such modification in this instance comprises a mixing device 10, as previously described herein, connected in series with a second mixing device 30 identical in substantially every respect to that of the first such mixing device 10. As shown in FIG. 13, the exit window 12 of the first mixing device 10 is placed opposite to and in close proximity with the entrance window 32 of the second mixing device 30, so that the light output from the exit window 12 of the first device is fed into the entrance window 32 of the second series connected device 30. The gap between the two windows 12 and 32 is preferably filled with a clear castable plastic 33 (such for example as the acrylic or epoxy types), having an index of refraction similar to that of the element fibers, to minimize loss by reflection at the two interfaces 12 and 32 and produce more uniformity of density and color at the exit window 34 of the second series connected mixing device 30.

In this particular modification the squarely arranged entrance windows of all elements making up the entrance window 32 of the second mixing device 30 will receive some colored and some white light from the alternating white and colored parallel lines (FIG. 11) appearing in the exit window 12 of the first mixing device 10. Consequently, the elongated or row-orientated exit windows making up the exit window 34 of the second series connected mixing device 30 will thus display alternate sections of colored and white light. The length and the sequence of these light components within each row will, however, be completely irregular and hence predictable only to the extent that the ratio of the number of fiber ends emitting colored light to the number of those emitting white light must be the same as the ratio of these two areas of the entrance window 12 of the first mixing unit 10 which are respectively covered or not covered by the movable filter 8. It should also be understood that due to this array of a large number of random light distributions a significant deviation from the average within any given area of the exit window 34 of the second mixing device 30 is statistically so highly improbable that a uniform mixture of the colored and white light becomes a virtual certainty. Hence the light beam emanating from the exit window 34 is completely devoid of a line structure appearance which might otherwise give the projected image the appearance of a television picture afflicted with visible scanning lines.

Just as it was desirable to systematically intermingle the exit ends of the fiber elements to further scatter the light, so too it is preferable to arrange the relative positions of the two light mixing devices 10 and 30 in such a way that the direction of the elongated ends of the elements in the exit window 12 of the mixing device 10 are disposed at right angles to the direction of the elongated ends of the elements in exit window 34 of the mixing device 30. Such arrangement will thus render the light distribution over the area of exit window 34 completely uniform, without regard to the corresponding light distribution within the area of the entrance window 12 of the mixing device 10 which is usually quite nonuniform, since most of the time it is not completely covered by the filter 8. Also, it has been found that the making of the entrance windows of the two mixing units of different size, such as by varying the diameter of the fibers perhaps as much as plus or minus ten percent, contributes considerably to the randomness of the terminal light and color distribution at the final exit window 34.

By connecting the two mixing devices in series, as in this particular modification of FIG. 13, the division of the elements into groups and sub-groups may be dispensed with, if desired in the interest of economy of production, since it can be readily seen that even without such division each element of the second series connected mixing unit 30 will receive the same proportion of white and colored light as emitted by the first unit 10. In those instances where the use of large transparencies is contemplated it may also become desirable in practice to make the exit window 34 of the mixing device 30 of larger area than its entrance window 32, which holds whether one or more mixing units are employed. This difference in area may be accomplished by employing tapered light-transmitting fibers of glass or plastic, or by spacing the fiber ends at the exit window of the mixing device farther apart than within its entrance window.

It should thus become obvious to those skilled in the art that a photographic printer and enlarger has been herein shown and described which is provided with a mixing device for so scrambling an uncolored light beam and a colored light beam entering the device that the light beam emerging from such mixing device is uniform as to both color distribution and intensity thus increasing the color fidelity of a finished print or enlargement made from a film transparency. Moreover, the mixing device itself is formed of elements made up of light-transmitting fibers of glass or plastic having such an orientation and intermingling of their respective fiber ends that the light beam emanating from the exit window of such mixing device is entirely different as to color and intensity distribution from that passing into the entrance window thereof.

Although several embodiments of the present invention have been herein shown and described it is to be understood that still further modifications thereof may be made without departing from the spirit and scope of the invention.

I claim:

1. A photographic printer and enlarger comprising a source of light, a housing surrounding said light source and having an opening for projecting a beam of light of predetermined area in a desired direction, a color filter movable at the will of an operator into the path of said beam of light to produce a colored and an uncolored light beam, a mixing device interposed between a film transparency to be printed and the path of movement of said color filter and provided with an entrance window at one end for the ingress of the colored and uncolored light beams and having an exit window at its opposite end for the egress of a single light beam, said entrance window comprising a group of elements individually formed by a bunch of light-transmitting fibers secured in parallel rows extending in two directions normal to each other at said entrance window, and said exit window comprising the opposite end of the fibers of each individual element arrayed in an elongated row, to cause said mixing device to scramble the colored and uncolored light beams passing into said entrance window and the production of a single light beam of uniform intensity and color distribution emerging from said exit window, for projection of said single light beam over the surface of said film transparency to make a print thereof having high color fidelity.

2. A photographic printer and enlarger comprising a source of light, a housing surrounding said light source and having an opening for projecting a beam of light of predetermined area in a desired direction, a color filter movable at the will of an operator into the path of said beam of light to produce a colored and an uncolored light beam, a mixing device interposed between a film transparency to be printed and the path of movement of said color filter and provided with an entrance window at one end for the ingress of the colored and uncolored light beams and having an exit window at its opposite end for the egress of a single light beam, said entrance window comprising a group of elements individually formed by a bunch of light-transmitting fibers secured in parallel rows extending in two directions normal to each other, and said exit window comprising the opposite end of the fibers of each individual element systematically intermingled and arrayed to form a plurality of elongated parallel rows each containing fiber ends from a preselected plurality of groups of elements, to cause said mixing device to scramble the colored and uncolored light beams passing into said entrance window and the production of a single light beam of uniform intensity and color distribution emerging from said exit window, for projection of said single light beam over the surface of said film transparency to make a print thereof having high color fidelity.

3. A photographic printer and enlarger comprising a source of light, a housing surrounding said light source and having an opening for projecting a beam of light of predetermined area in a desired direction, a color filter movable at the will of an operator into the path of said beam of light to produce a colored and an uncolored light beam, a mixing device interposed between a film transparency to be printed and the path of movement of said color filter and provided with an entrance window at one end for the ingress of the colored and uncolored light beams and having an exit window at its opposite end for the egress of a single light beam, said entrance window comprising a group of elements individually formed by a bunch fo light-transmitting fibers secured in parallel rows extending in two directions normal to each other with said groups arbitrarily divided into subgroups of a plurality of parallel consecutive groups each and extending in one direction, and said exit window comprising the opposite end of the fibers of each individual element systematically intermingled and arrayed to form adjacent elongated parallel rows with each individual row comprising a fiber selected from each successive element of one sub-group alternately disposed relative to a fiber end selected from the same consecutive element of another adjacent successive sub-group, to cause said mixing device to scramble the colored and uncolored light beams passing into said entrance window and the production of a single light beam of uniform intensity and color distribution emerging from said exit window, for projection of said single light beam over the surface of said film transparency to make a print thereof having high color fidelity.

4. A photographic printer and enlarger comprising a source of light, a housing surrounding said light source and having an opening for projecting a beam of light of predetermined area in a desired direction, a color filter movable at the will of an operator into the path of said beam of light to produce a colored and an uncolored light beam, a mixing device interposed between a film transparency to be printed and the path of movement of said color filter and provided with an entrance window at one end for the ingress of the colored and uncolored light beams and having an exit window at its opposite end for the egress of a single light beam, said entrance window comprising a group of elements individually formed by a bunch of light-transmitting fibers secured in parallel rows extending in two directions normal to each other, and said exit window comprising the opposite end of the fibers of each individual element arrayed in an elongated row, to cause said mixing device to scramble the colored and uncolored light beams passing into said entrance window and the production of a single light beam of uniform intensity and color distribution emerging from said exit window, and means connected to said mixing device and operable to cause oscillatory movement of said exit window thereof at a predetermined amplitude and frequency to still further augment the uniformity of the intensity and color distribution of the exit light beam prior to projection of the latter over the surface of said film transparency to make a print thereof having high color fidelity.

References Cited by the Examiner
UNITED STATES PATENTS

| | | | |
|---|---|---|---|
| 3,043,179 | 7/1962 | Dunn | 88—1 X |
| 3,130,263 | 4/1964 | Manning | 88—1 X |

NORTON ANSHER, *Primary Examiner.*

R. A. WINTERCORN, *Examiner.*